No. 680,739. Patented Aug. 20, 1901.
G. S. SHEFFIELD.
CORN PLANTER.
(Application filed July 22, 1899.)
(No Model.)
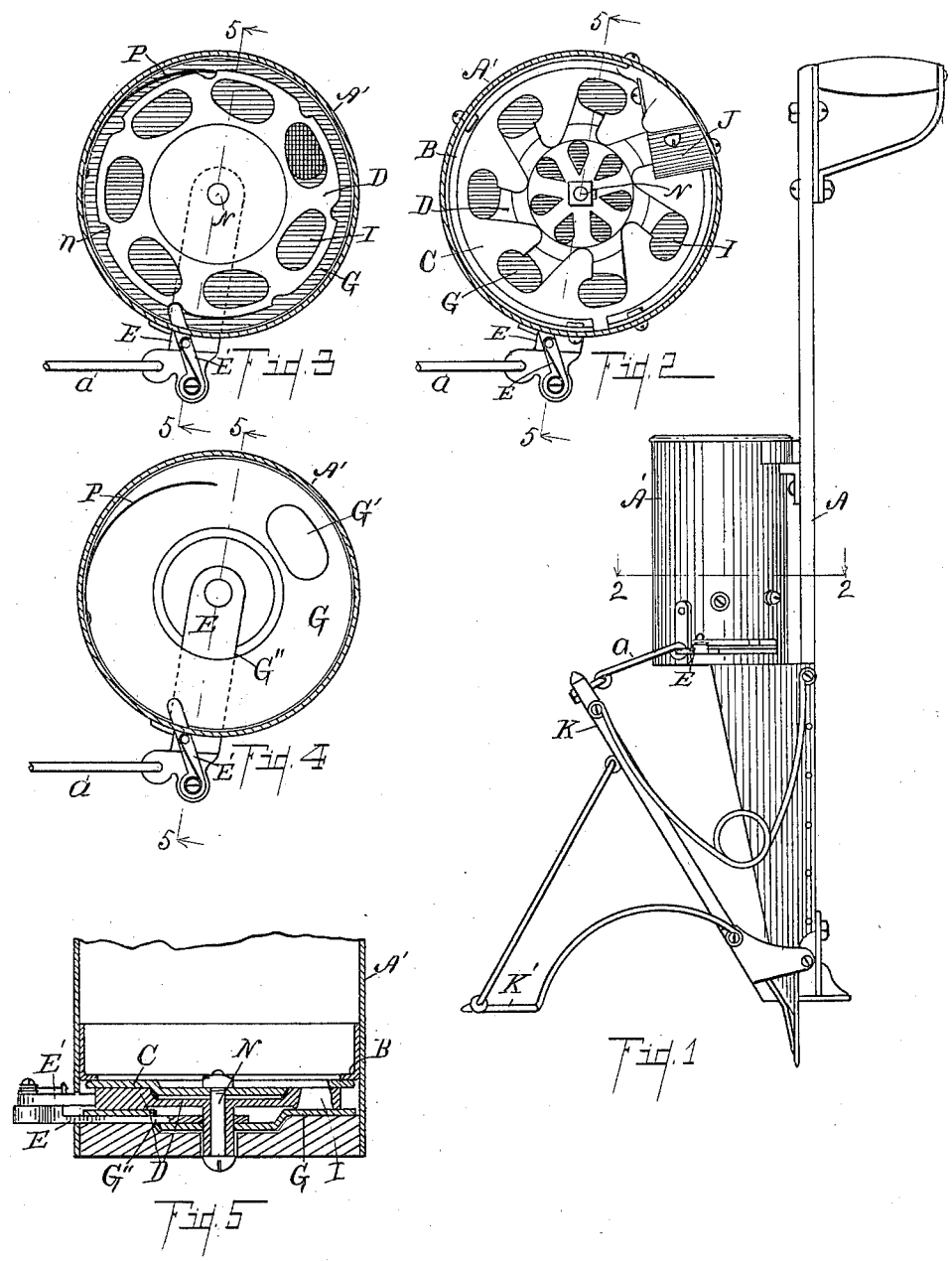
Witnesses:
Otis A. Earl
Cassa M. Chappell
Inventor,
George S. Sheffield
By Fred L. Chappell
Att'y.
THE NORRIS PETERS CO., PHOTO-LITHO., WASHINGTON, D. C.

UNITED STATES PATENT OFFICE.

GEORGE S. SHEFFIELD, OF BURROAK, MICHIGAN, ASSIGNOR TO THE SHEFFIELD MANUFACTURING COMPANY, OF SAME PLACE.

CORN-PLANTER.

SPECIFICATION forming part of Letters Patent No. 680,739, dated August 20, 1901.

Application filed July 22, 1899. Serial No. 724,872. (No model.)

*To all whom it may concern:*

Be it known that I, GEORGE S. SHEFFIELD, a citizen of the United States, residing at the city of Burroak, in the county of St. Joseph and State of Michigan, have invented certain new and useful Improvements in Corn-Planters, of which the following is a specification.

This invention relates to improvements in corn-planters.

The object of the invention is to improve the details of the construction of the corn-dropping mechanism whereby the same may be manufactured with greater facility and at the same time operate with great ease and effectiveness.

Further objects will appear in the detailed description to follow.

I accomplish the objects of my invention by the devices and means described in this specification.

The invention is clearly defined and pointed out in the claims.

A structure embodying the features of my invention is clearly illustrated in the accompanying drawings, forming a part of this specification, in which—

Figure 1 is a side elevation of a corn-planter embodying the features of my invention. Fig. 2 is an enlarged transverse horizontal sectional view taken on a line corresponding to line 2 2 of Fig. 1. Fig. 3 is an enlarged detail sectional view on a line corresponding to line 2 2 of Fig. 1 with the retaining rim and plate C removed. Fig. 4 is a similar sectional view with only the lever and circular bottom disk G in the bottom remaining in position. Fig. 5 is a vertical transverse detail sectional elevation taken on a line corresponding to line 5 5 of Figs. 2, 3, and 4.

In the drawings all of the sectional views are taken looking in the direction of the little arrows at the ends of the section-lines, and similar letters of reference refer to similar parts throughout the several views.

Referring to the lettered parts of the drawings, A is a corn-planter of a construction similar to that shown in my prior patent, No. 461,054, issued October 13, 1891, to which my improvements are applied.

A' is the cylindrical seed box or hopper, from which corn or other seed is delivered to the planter. The feature of the planter to which my improvements relate is this seed box or hopper. In the bottom of the seed box or hopper are retained plates C and D, carried on a suitable central pivot N and forming the seed-pockets I in the same manner that they are formed in my former patent referred to. In the bottom of this box is a sheet-metal disk G, containing a perforation G', which has a reciprocatory motion under the plates forming the feed-pockets. This disk is concaved at the center, and a perforation G'' is formed therethrough to receive lever E, which lever extends to the center and is retained by the central pivot N. It is by means of this lever that the disk is actuated. On the outer end of this lever is a pawl E', adapted to engage and rotate the plate D by engaging notches $n$ in its periphery. This plate is retained in its actuated position by the spring-pawl P.

The advantages of the construction are that the sheet-metal plate G moves beneath the seed-pockets and forms the bottom of the same in passing around the bottom of the box, and by its motion at intervals causes the seed to descend into the same, so that the amount fed is entirely even and under control and not liable to accidental variations. By this method the bottom plate is formed circular, and by simply perforating it at G'' a positive engagement between it and the lever E with its pawl E', which is operated in exactly the same manner and by the same means as in my former patent referred to. Thus the device is greatly simplified, the advantage of the movable disk beneath secured in connection with the other features described in my former patent. These parts, it will be observed, are very simple and are inserted in the feed-box by merely placing the disk G in the bottom of the same and inserting the broad flat lever E in the slot G'' and inserting the pivot N through the same. This avoids any cumbersome riveting of the parts together, which is substantially an impossibility when the parts are in place, and avoids cutting any large slots for the insertion of the parts after they have been riveted, and the parts are always retained and guided in position in the bottom of the hopper by the central pivot thereof.

All of the remaining parts of the structure are in the same form substantially as those appearing in my former patent.

Having thus described my invention, what I claim as new, and desire to secure by Letters Patent, is—

1. In a planter, the combination of disks with feed-pockets formed therein, supported on a suitable pivot; a disk of sheet metal G, with its center depressed having a slot G'', therein and a slot G', for allowing seeds to pass; a broad, flat lever E, with a pawl at its outer end arranged in the slot G'', and engage the central pivot whereby the metal disk G, can be oscillated by the actuating of the lever, so that the parts can be easily assembled coacting for the purpose specified.

2. In a planter, the combination with a seed-hopper having a slot in one side; a perforated disk to gather the seeds; a sheet-metal disk in the bottom thereof perforated for the passage of the seed and having a slot through the body thereof; a pivot through the center thereof; a lever arranged in the slot in the said sheet-metal disk and said slot in the side of the hopper and engaging the said pivot at the center whereby the said sheet-metal disk is oscillated and so that the parts can be easily assembled, as specified.

In witness whereof I have hereunto set my hand and seal in the presence of two witnesses.

GEORGE S. SHEFFIELD. [L. S.]

Witnesses:
   A. P. THURSTON,
   C. D. HIMEBAUGH.